Sept. 25, 1928.

A. J. BROWN 1,685,739

ROTOR FOR DYNAMO ELECTRIC MACHINES

Filed July 18, 1921

Patented Sept. 25, 1928.

1,685,739

UNITED STATES PATENT OFFICE.

ARTHUR J. BROWN, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

ROTOR FOR DYNAMO-ELECTRIC MACHINES.

Application filed July 18, 1921. Serial No. 485,652.

This invention relates in general to dynamo-machines and has particular relation to machines wherein the windings are disposed in slotted cores.

In accordance with recognized practice in the design and construction of certain types of dynamo-electric machines, especially the rotor elements thereof, the depth of the core slots in which the windings are disposed, and hence the amount of copper in such windings, is limited by the fact that the thickness of the teeth of the core adjacent the bottom or inner portions of the slots, that is, the cross-sectional area of the teeth at the roots thereof, must be of a certain value in order to withstand the mechanical stresses set up in the core during operation of the machine. This is especially true in the case of the rotating field elements of high-speed machines where the mechanical stresses, due to centrifugal force acting upon the teeth and the windings in the slots, are liable to be very great.

In certain types of machines, as for instance, high-speed, synchronous, alternating current machines, this matter of providing sufficient slot space for the reception of the required amount of copper field winding, without unduly increasing the diameter and length of the rotor core is of extreme importance, and the higher the speed of the machine, the greater the importance. In the case of bipolar generators, operating at 3600 R. P. M., a type of machine which is ordinarily used when the generator is driven by a steam turbine, the rotor must be made of as small a diameter as possible in order to reduce the peripheral speed and centrifugal force to a minimum. Hence, it is important from the standpoints of cost and efficient operation that the rotor be of the smallest size that can carry the required amount of field copper to efficiently produce the required core flux, and also that the core be of sufficient mechanical strength to withstand the mechanical stresses set up therein, especially in the core teeth and the windings associated therewith which are inserted in the slots of the core.

In accordance with this invention, a core construction is provided wherein the required minimum thickness of the core teeth is preserved while providing a maximum winding space for the reception of copper winding. This construction includes the provision of slots of unequal depth and so disposed as to preserve sufficient thickness at the root portions of the teeth between the slots, so as to insure that all parts may safely withstand any stresses set up therein during operation, and to preserve the required cross-section of the magnetic path of the core at the radially inner ends of the slots.

It is an object of this invention to provide an improved design and construction of dynamo-electric machine wherein the core slots are such as to provide a maximum winding space while preserving the desired mechanical and magnetic characteristics of the core.

It is a further object of this invention to provide an improved design and construction of dynamo-electric machine embodying a rotatable core element having winding receiving slots of unequal size, while preserving the desired mechanical and magnetic characteristics of the core.

It is a further object of this invention to provide an improved design and construction of dynamo-electric machine embodying a rotatable core wherein adjacent radially disposed winding slots are of different radial depth and cross-sectional area.

It is a further object of this invention to provide an improved design and construction of dynamo-electric machine embodying a bipolar, rotary field element wherein the field winding includes a plurality of turns in series located in radially disposed slots, adjacent slots being of different depth and containing different amounts of copper winding.

These and other objects and advantages are secured by this invention, the various novel features of which will be apparent from the accompanying description and drawings, disclosing one embodiment of the invention, and are intended to be more particularly pointed out in the claims.

Figure 1:
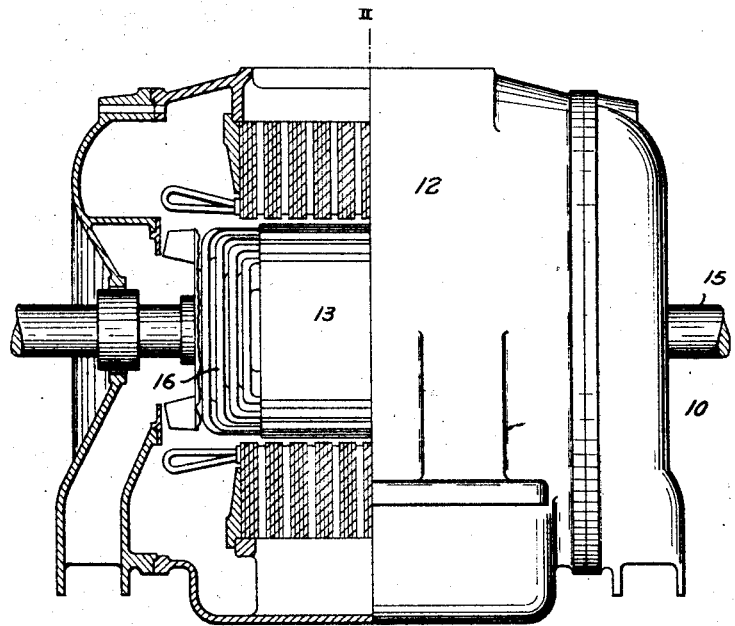
Fig. 1 is a front elevation, partly in section, of a dynamo-electric machine whose rotary field element embodies features of this invention.

In accordance with the disclosure of the drawings, a dynamo-electric machine, of the type usually known as a turbo-generator, includes a stator 12, constituting a stationary armature and including a core and windings disposed in slots therein, and a rotary field element 13. The rotary field element comprises a core 14, which may be solid as here shown, or made up of laminations arranged in groups with air spaces therebetween and held in operative position and mounted upon a shaft 15. The core is provided with an energizing winding 16, in the form of a plurality of turns arranged in a plurality of layers in the radial slots 17, 18 of the core. Teeth 19 are formed by the slots 17, 18; and wedges 20 coact with the sides of the outer portions of the teeth to hold the winding 16 in place within the slots. The slots 17, 18 are preferably of the same width throughout, and the cross-sectional area of the winding is preferably the same throughout all the turns of its full length. As is usual in the ordinary design, the winding 16 is laid in the pair of slots nearest to or furthest from the axis of the polar portion 21 of the core until the required amount of winding is in place in such slots, and the winding is then disposed successively in the pairs of slots more or less remote from the axis of the pole 21.

In accordance with previous designs of the rotary field element of this type of dynamo-electric machine, it has been customary to have the slots all of the same depth with sufficient cross-sectional area at the roots of the teeth to withstand the mechanical stresses due to centrifugal force on portions of the teeth and the windings in the slots; and this cross-sectional area at the roots of the teeth determined the depth of the slots and, hence, the amount of copper that might be included in a rotor of a particular size and designed for a particular operating speed. In accordance with the present design, the slots 17 may be of a depth corresponding to the desired thickness or cross-sectional area of the teeth at a point opposite the bottom of the slots 17, indicated at 23; but the slots 18 may be extended radially inward to a depth that is determined especially in the case of a solid core, practically only by the requirement that there be sufficient core material beyond the radially inner portion of the slot to provide the required magnetic path between the poles of the core.

With this design, it will be apparent that the requirement for sufficient mechanical strength at the roots of the teeth may be fully preserved or complied with, and, in addition, provision is made for space for disposing an additional amount of copper for energizing purposes. In the particular embodiment of the invention illustrated, the slots 17 contain 11 layers of winding, while the slots 18, with their extra depth provide for 14 layers, thus providing for approximately fourteen percent more energizing copper than might safely be disposed on the same core if all of the slots were of the same depth as the slots 17.

The effect of this added copper space in certain slots of any particular core is that with the additional winding available, the ampere turns required to give the desired field flux can be produced with less current density and, hence, with less $I^2R$ losses; and, in addition, with less current density in the winding, the amount of heat to be dissipated during operation of the machine is less, and since the proper dissipation of heat from the rotor core and winding is, at best, no simple proposition, with lower current density and less heat produced by the winding, the problem of properly dissipating this heat is simplified. Further, considerably greater energizing effects may be secured while maintaining a sufficiently low current density in the winding.

Figure 2:
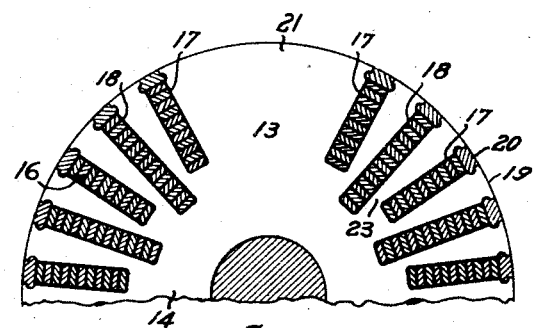
Fig. 2 is a section taken along the plane of line II—II of Fig. 1.

In the embodiment of the invention illustrated, the slots adjacent the polar axis of the pole 21 are shallow slots 17; and under the more ordinary conditions of design, it will be found that the material of the core can be better utilized, that is, from the standpoint of providing the maximum amount of copper winding of suitable size, by having those core slots nearest to the polar axis, of the shallow variety. By providing the shallower slots adjacent the polar axes, as indicated in Figure 2, it will be apparent that the minimum cross-sectional area of the polar portion 21 can be made a maximum, for the width of this polar portion is measured between the adjacent portions of the inner ends of the slots at opposite sides of the axis of the pole; and it will be apparent that this thickness of the polar portion decreases as the depth of these slots increases.

A general effect of utilizing this invention is to increase the efficiency and output of a machine having a core of a certain size, or to obtain the same output from a core of smaller size, in either case providing an obviously more desirable design and construction than is offered by the prior art.

It should be understood that it is not desired that the invention claimed be limited to the exact details of construction shown and described, for obvious modifications will readily occur to a person skilled in the art.

It is claimed and desired to secure by Letters Patent:

1. In a dynamo-electric machine, a rotor comprising a core provided with radially extending peripheral slots of substantially the same width and different depth, and a winding disposed in said slots, adjacent slots containing different total cross-sectional areas of said winding, and winding elements in one slot being connected in series relation with winding elements in the adjacent slot.

2. A rotary field element for a dynamo-electric machine, comprising a core provided with radially extending peripheral slots of substantially the same width and different depth, and a winding disposed in said slots, the total cross-sectional area of the winding elements in a deeper slot being greater than that in a shallow slot, and a winding element in the deeper slot being connected in series relation with a winding element in the shallower slot.

3. A rotary field element for a dynamo-electric machine, comprising a core provided with peripheral, winding-receiving slots of substantially the same width and different depths, the slots immediately adjacent a polar axis of said core being shallower than slots more remote from said axis.

4. In a dynamo-electric machine, a rotary field element comprising a core provided with radially extending peripheral slots of substantially the same width and different depth, the slots nearest the polar axes of said core being shallower than the slots immediately adjacent the first slots, and a field energizing winding having portions disposed in each of said slots.

5. In a dynamo-electric machine, a rotary field element comprising a core provided with radially extending peripheral slots of substantially the same width and different depths, the slots immediately adjacent a polar axis of said core being shallower than slots more remote from said axis, and a winding disposed in said slots, said winding being of substantially the same cross-sectional area and shape throughout a full turn thereof and having different numbers of layers in different slots.

6. In a dynamo-electric machine, a bipolar rotary field element comprising a core provided with radially extending peripheral slots of substantially the same width, the slots on each side of a polar axis of said core being of different depths, and the slots immediately adjacent said polar axis being shallower than the slots more remote from said axis, and a winding disposed in said slots, said winding being of substantially the same cross-sectional area and shape throughout the full length thereof and having different numbers of layers in adjacent slots.

In testimony whereof, the signature of the inventor is affixed hereto.

ARTHUR J. BROWN.